(12) United States Patent
Gierlings et al.

(10) Patent No.: US 11,628,658 B2
(45) Date of Patent: Apr. 18, 2023

(54) DEVICE FOR LAMINATING A SUBSTRATE WITH A THERMOPLASTIC COATING MATERIAL

(71) Applicant: Klomfass Gierlings & Partner GbR (vertretungsberechtigter Gesellschafter Michael Gierlings...), Duesseldorf (DE)

(72) Inventors: Michael Gierlings, Kaarst (DE); Thorsten-Derrick Klomfass, Duesseldorf (DE)

(73) Assignee: Klomfass Gierlings & Partner GbR (vertretungsberechtigter Gesellschafter Michael Gierlings...), Duesseldorf (DE)

( * ) Notice: Subject to any disclaimer, the term of this patent is extended or adjusted under 35 U.S.C. 154(b) by 0 days.

(21) Appl. No.: 16/641,312

(22) PCT Filed: Aug. 22, 2018

(86) PCT No.: PCT/EP2018/072604
§ 371 (c)(1),
(2) Date: Feb. 24, 2020

(87) PCT Pub. No.: WO2019/038311
PCT Pub. Date: Feb. 28, 2019

(65) Prior Publication Data
US 2020/0384751 A1    Dec. 10, 2020

(30) Foreign Application Priority Data

Aug. 25, 2017   (DE) .................... 10 2017 119 576.9

(51) Int. Cl.
*B32B 37/00* (2006.01)
*B32B 37/04* (2006.01)
(Continued)

(52) U.S. Cl.
CPC .......... *B32B 37/0053* (2013.01); *B32B 37/04* (2013.01); *B32B 37/06* (2013.01);
(Continued)

(58) Field of Classification Search
CPC . B29C 66/348; B29C 66/0342; B29C 66/349; B29C 66/83411; B29C 66/83413;
(Continued)

(56) References Cited

U.S. PATENT DOCUMENTS 4,069,081 A    1/1978  Drower et al.
5,111,595 A *  5/1992  Bessinger .......... B41F 23/0479
                                                    34/324
(Continued)

FOREIGN PATENT DOCUMENTS

DE    10 2010 040 059 A1    3/2012
DE    10 2013 001 826 A1    8/2014
(Continued)

OTHER PUBLICATIONS

Machine translation of WO 2014118356 date unknown.*
International Search Report in PCT/EP2018/072604, dated Nov. 20, 2018.

*Primary Examiner* — John L Goff, II
(74) *Attorney, Agent, or Firm* — Collard & Roe, P.C.

(57) ABSTRACT

A device for laminating a substrate with a thermoplastic coating material has an IR heating device for melting a surface of the coating material, an opposite cooling apparatus which actively cools the opposite surface of the coating material, and at least one press-roller assembly, which presses together the substrate web and the coating material to produce a hot-melt adhesive bond. In order to prevent any irregularities in the finished product, the cooling apparatus is designed as a rotatably driven cooling roller, over the circumference of which the following are arranged in succession: a feed apparatus for the thermoplastic coating
(Continued)

material, one or more IR radiant heaters for heating the surface of the thermoplastic coating material resting on the cooling roller, a feed apparatus for the substrate web, one or more press rollers for pressing the substrate web against the coating material, and a removal apparatus for the laminated product.

6 Claims, 1 Drawing Sheet

(51) Int. Cl.
    *B32B 37/06*     (2006.01)
    *B32B 37/08*     (2006.01)
    *B32B 37/12*     (2006.01)
    *B32B 37/20*     (2006.01)
    *B32B 41/00*     (2006.01)

(52) U.S. Cl.
    CPC .......... *B32B 37/08* (2013.01); *B32B 37/1284* (2013.01); *B32B 37/203* (2013.01); *B32B 41/00* (2013.01); *B32B 2310/0825* (2013.01); *B32B 2398/20* (2013.01); *B32B 2439/70* (2013.01)

(58) Field of Classification Search
    CPC ............ B29C 65/1412; B29C 65/1416; B29C 65/1419; B29C 65/1422; B29C 65/1612; B29C 65/1616; B29C 65/1619; B29C 65/1622; B32B 37/0053; B32B 37/04; B32B 37/06; B32B 37/08; B32B 37/1284; B32B 37/203; B32B 41/00; B32B 2398/20; B32B 2439/70; B32B 2310/0825
    USPC .................. 156/308.2–309.9, 324, 292, 498
    See application file for complete search history.

(56) References Cited

U.S. PATENT DOCUMENTS 10,350,855 B2    7/2019   Kinzelmann et al.
2018/0162113 A1   6/2018   Kono et al.

FOREIGN PATENT DOCUMENTS

| EP | 3 098 060 A1 | 11/2016 | |
|----|----|----|----|
| WO | WO-2014118356 A1 * | 8/2014 | ......... B29C 66/3494 |
| WO | 2016/026918 A1 | 2/2016 | |
| WO | 2017/004613 A1 | 1/2017 | |
| WO | 2017/026346 A1 | 2/2017 | |

\* cited by examiner

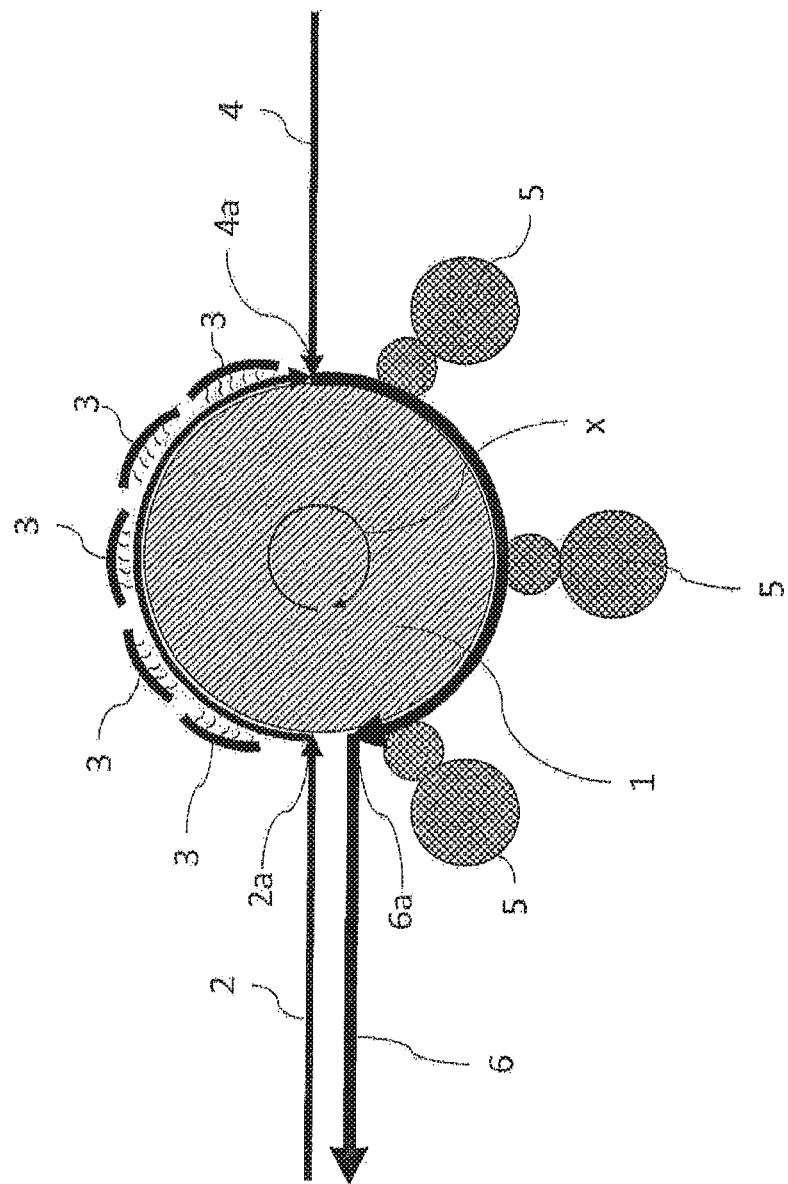

DEVICE FOR LAMINATING A SUBSTRATE WITH A THERMOPLASTIC COATING MATERIAL

CROSS REFERENCE TO RELATED APPLICATIONS

This application is the National Stage of PCT/EP2018/072604 filed on Aug. 22, 2018, which claims priority under 35 U.S.C. § 119 of German Application No. 10 2017 119 576.9 filed on Aug. 25, 2017, the disclosure of which is incorporated by reference. The international application under PCT article 21(2) was not published in English.

The invention relates to a device for continuously laminating a substrate with a thermoplastic coating material, comprising an IR heating device, by means of which the surface of the thermoplastic coating material is melted, comprising a cooling apparatus which is opposite the heating apparatus and actively cools the surface of the continuous thermoplastic coating material that is opposite the molten surface, and comprising at least one press-roller assembly, by means of which a continuous substrate web and the continuous thermoplastic film web are pressed together to produce a bond between the substrate web and the thermoplastic material.

The laminates produced using such devices are particularly advantageous for the production of sanitary products, films for food packaging, construction films, agricultural films and other technical laminates, because either no adhesive is used in their production or it is possible to significantly reduce the amount of adhesive used. Non-woven materials are possible in particular as substrates for sanitary products, but woven or knitted textiles and thin foam webs are also possible. For other applications, other substrates made of e.g. thermoplastic plastics materials such as PE, CPP, etc., may also be used.

A device of the type mentioned at the outset is known from DE 10 2013 001 826 A1, for example. In this known device, the cooling apparatus is designed as a stationary cooling plate, over which the continuous thermoplastic film web is guided, and which cools the film web from below, while it is simultaneously melted from above by means of the heating apparatus. One problem with this known device is that the continuous film web is relatively unstable due to the melting of its surface and despite the cooling of its opposite surface. As a result, there is the risk that the tensioned thermoplastic film web will become distorted before it reaches the press-roller assembly, and therefore corresponding irregularities are produced in the end product.

A problem that is similar in principle results in another device that is known according to the prior art (WO 2016/026918A1), which, however, operates with adhesive but likewise provides activation of the surface of the thermoplastic film web to be bonded by melting the surface thereof. In this known device, a supporting conveyor belt that passes around rollers is arranged between the stationary cooling plate and the thermoplastic film to be cooled. However, this supporting conveyor belt significantly impairs the cooling effect of the cooling apparatus and does not sufficiently stabilize the continuous thermoplastic film web in the region in front of the press-roller assembly. Evenly melting the film web is also not as important in this device, because sufficient adhesive can additionally be used.

In order to eliminate the problems caused by the cooling, the device known from EP 3 098 060 A1 attempts to melt the surface of the continuous thermoplastic film web without any cooling of the opposite surface. To make this possible, an IR laser is used here to melt the surface and cooling of the opposite surface is completely omitted. In this device, there is of course also the risk that the tensioned thermoplastic film web, which is melted on its surface and is therefore weakened, becomes distorted before it enters the press-roller assembly. Furthermore, it is not easy to distribute the highly focused energy of one laser beam evenly over the surface of the continuous thermoplastic film web, in particular if it is taken into account that this film web is passing through at speeds of up to 350 m/min. There is thus the risk that irregularities may develop due to differing thermal expansion in the surface region of the film web or that the thermoplastic film web does not sufficiently adhere to the substrate at points.

The problem addressed by the invention is therefore to develop the device of the type mentioned at the outset such that the thermoplastic coating material does not become distorted before entering the press-roller assembly and even adhesion of the thermoplastic coating material to the substrate web is ensured.

In order to solve this problem, proceeding from a device of the type mentioned at the outset, the invention proposes that the cooling apparatus is designed as a rotatably driven cooling roller, over the circumference of which the following are arranged in succession:

a feed apparatus for the thermoplastic coating material,
one or more IR radiant heaters for heating the surface of the thermoplastic coating material resting on the cooling roller,
a feed apparatus for the substrate web,
one or more press-roller assemblies for pressing the substrate web against the molten surface of the thermoplastic coating material resting on the cooling roller,
and a removal apparatus for the finished laminated product.

In the device according to the invention, the thermoplastic coating material rests on the surface of the rotatably driven cooling roller over its entire surface, without moving, and thus entirely without tension during the entire period between feeding to the cooling roller and removing the finished laminated product from the cooling roller, such that no distortion or displacement can occur. As a result of the fact that the surface of the thermoplastic coating material can be melted over a comparatively large angular path over the circumference of the cooling roller, very even heating of the surface to be melted can be achieved, even at a high web speed.

It is particularly advantageous if a plurality of press-roller assemblies for pressing the substrate web against the molten surface of the thermoplastic coating material resting on the cooling roller are provided over the circumference of the cooling roller in the rotational direction behind the feed apparatus for the substrate web. As a result, the contact pressure can be gradually increased from one press-roller assembly to the next, which results in an improvement in the adhesive bond.

One expedient embodiment of the device according to the invention provides that the cooling roller is provided with connections for supplying and discharging a fluid coolant. By accordingly temperature-controlling this liquid coolant, it is possible to keep the surface temperature of the cooling roller exactly constant.

It is also expedient if both the melting of the thermoplastic coating material and the pressing of the substrate web against the molten coating material each take place over one half of the cooling roller. This is achieved in that the IR radiant heaters and the press-roller assemblies are each arranged so as to be distributed over one half of the circumference of the cooling roller. As a result, even at a high web speed, there is enough time available for both processes.

In order to further protect the thermoplastic coating material against any unintended displacement on the surface of the cooling roller, it is further provided that fixing devices which fix the side border of the thermoplastic coating material over the circumference of the cooling roller are provided over the circumference of the cooling roller along the side edges of the thermoplastic coating material.

The above-mentioned fixing devices may be designed as clips or guide belts, for example.

If the above-mentioned melt adhesion is not considered sufficient, the feed apparatus for the substrate web can lastly additionally be provided with an adhesive feed.

One embodiment of the invention is described in greater detail in the following on the basis of the drawings, the single FIGURE of which is a schematic section through the device according to the invention.

In the drawings, a cooling roller is denoted by reference sign 1. This cooling roller is provided with connections (not shown) for supplying and discharging a coolant, for example water or oil, and can be kept at a constant temperature of from 5° C. to 40° C., for example, by means of said coolant.

The cooling roller 1 is rotatably driven in the direction of the rotational arrow x. The following are arranged in succession around the cooling roller in the direction of the rotational arrow x:

a feed apparatus 2a for a thermoplastic coating material in the form of a film web 2, a plurality of IR radiant heaters 3 for heating the surface of the thermoplastic film web 2 resting on the cooling roller 1, a feed apparatus 4a for a substrate web 4, it being possible for this feed apparatus 4a to additionally be provided with an adhesive feed apparatus (not shown) if required, three press-roller assemblies 5 for pressing the substrate web 4 against the molten surface of the thermoplastic film web 2 resting on the cooling roller 1, and a removal apparatus 6a for the laminated product 6, which consists of the substrate web 4 and the thermoplastic film web 2 that has been laminated thereon.

The device according to the invention operates as follows:

The centrally arranged cooling roller 1 is rotatably driven in the direction of the rotational arrow x. The continuous thermoplastic film web 2 is fed to the surface of the cooling roller 1 by means of the feed apparatus 2a. The fed thermoplastic film web 2 is then guided past the IR radiant heaters 3, which are arranged over approximately one half of the circumference of the cooling roller 1, by the rotating cooling roller 1. In the process, the surface of the film web 2 facing the radiant heaters 3 heats up to the melting temperature. By contrast, the surface of the thermoplastic film web 2 resting on the cooling roller 1 does not melt and remains intact. So that the thermoplastic film web 2 cannot become displaced relative to the surface of the cooling roller 1 on its path along the radiant heaters 3, it is fixed in position on the cooling roller on this path by clips located in the region of its side borders (not shown in the drawings).

The substrate web 4 is fed behind the last radiant heater 3 by means of the feed apparatus 4a and is then pressed against the molten surface of the thermoplastic film web 2 resting on the cooling roller 1 by means of the press-roller assemblies 5. The press-roller assemblies 5 are arranged so as to be distributed over the remaining half of the circumference of the cooling roller 1 and increase the generated contact pressure from one press-roller assembly 3 to the next. As a result, the quality of the adhesion is considerably increased.

The removal apparatus 6a for the finished laminated product 6, which, here, is in the form of a continuous product web consisting of the substrate web and the thermoplastic film web laminated thereon, is then located behind the last press-roller assembly 5.

The invention claimed is:

1. A device for continuously laminating a substrate with a continuous thermoplastic, film-shaped coating material, comprising an infrared (IR) heating device, by means of which a surface of the continuous thermoplastic, film-shaped coating material is melted, the IR heating device comprising at least one IR radiant heater for heating the surface of the continuous thermoplastic, film-shaped coating material, a cooling apparatus which is opposite the IR heating device and actively cools the surface of the continuous thermoplastic, film-shaped coating material that is opposite the molten surface, and at least one press-roller assembly, by means of which a continuous substrate web and the continuous thermoplastic, film-shaped coating material are pressed together to produce a hot-melt adhesive bond between the continuous substrate web and the continuous thermoplastic, film-shaped coating material, wherein the cooling apparatus is designed as a rotatably driven cooling roller, over the circumference of which the following are arranged in succession, in the order given below:

a first feed apparatus for the continuous thermoplastic, film-shaped coating material, the at least one or more IR radiant heater for heating the surface of the continuous thermoplastic, film-shaped coating material resting on the cooling roller, a second feed apparatus for the continuous substrate web, the at least one press-roller assembly for pressing the continuous substrate web against the molten surface of the continuous thermoplastic, film-shaped coating material resting on the cooling roller, and a removal apparatus for the laminated product, and wherein the device is configured so that the continuous thermoplastic, film-shaped coating material rests on the cooling roller without moving and is without tension between feeding to the cooling roller and removing the laminated product.

2. The device according to claim 1, wherein the cooling roller is provided with connections for supplying and discharging a fluid coolant.

3. The device according to claim 1, wherein the first feed apparatus, the at least one IR radiant heater, and the second feed apparatus are arranged so as to be distributed over a first half of the circumference of the cooling roller and the at least one press-roller assembly and the removal apparatus are arranged so as to be distributed over a second half of the circumference of the cooling roller.

4. The device according to claim 1, wherein fixing devices which fix a side border of the continuous thermoplastic, film-shaped coating material in position when the continuous thermoplastic, film-shaped coating material passes around the cooling roller are provided over the circumference of the cooling roller along the side edges of the continuous thermoplastic, film-shaped coating material.

5. The device according to claim 4, wherein the fixing devices are designed as clips or guide belts.

6. The device according to claim 1, wherein the second feed apparatus for the continuous substrate web is additionally provided with an adhesive feed.

\* \* \* \* \*